United States Patent
Harada

(10) Patent No.: US 11,300,096 B2
(45) Date of Patent: Apr. 12, 2022

(54) METHOD FOR DETERMINING ARRANGEMENT POSITION OF VORTEX GENERATOR ON WIND TURBINE BLADE, METHOD FOR PRODUCING WIND TURBINE BLADE ASSEMBLY, AND WIND TURBINE BLADE ASSEMBLY

(71) Applicant: MITSUBISHI HEAVY INDUSTRIES, LTD., Tokyo (JP)

(72) Inventor: Motoshi Harada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 529 days.

(21) Appl. No.: 15/988,835

(22) Filed: May 24, 2018

(65) Prior Publication Data
US 2019/0010917 A1    Jan. 10, 2019

(30) Foreign Application Priority Data
Jul. 5, 2017    (JP) .............................. JP2017-131771

(51) Int. Cl.
*F03D 1/06*    (2006.01)

(52) U.S. Cl.
CPC ......... *F03D 1/0641* (2013.01); *F03D 1/0675* (2013.01); *F05B 2220/706* (2013.01);
(Continued)

(58) Field of Classification Search
None
See application file for complete search history.

(56) References Cited

U.S. PATENT DOCUMENTS

2014/0140856 A1* 5/2014 Madsen ................ F03D 1/0641
                                                           416/236 R
2014/0219810 A1    8/2014 Wuerth et al.
(Continued)

FOREIGN PATENT DOCUMENTS

EP    1944505 A1    7/2008
EP    2201243 B1    3/2011
(Continued)

OTHER PUBLICATIONS

"Effect of Blade Roughness on Transition and Wind Turbine Performance" R.S. Ehrmann et al. 2010 John Wiley & Sons, Ltd. (Year: 2010).*
(Continued)

*Primary Examiner* — Kayla Mccaffrey
(74) *Attorney, Agent, or Firm* — Kanesaka Berner and Partners LLP

(57) ABSTRACT

A method for determining an arrangement position of a vortex generator on a wind turbine blade includes: determining, for a first region of a mounting range of the vortex generator in a blade spanwise direction, an arrangement position of the vortex generator to be an angular position offset by a predetermined angle toward a trailing edge of the wind turbine blade with reference to an inflow angle of wind to the wind turbine blade; and determining, for a second region closer to a blade tip, the arrangement position of the vortex generator to be a position between a separation position of a flow on a surface of the wind turbine blade under a rated wind speed condition and a transition position of the flow on the surface of the wind turbine blade under a variable speed operation condition of a wind turbine including the wind turbine blade.

19 Claims, 10 Drawing Sheets

(52) U.S. Cl.
CPC ... *F05B 2230/60* (2013.01); *F05B 2240/2211* (2013.01); *F05B 2240/30* (2013.01)

(56) References Cited

U.S. PATENT DOCUMENTS

| | | | |
|---|---|---|---|
| 2015/0361952 A1* | 12/2015 | Petsche | F03D 1/0683 |
| | | | 416/223 A |
| 2016/0215758 A1* | 7/2016 | Corten | F03D 1/0675 |
| 2018/0038341 A1 | 2/2018 | Fukami | |

FOREIGN PATENT DOCUMENTS

| | | |
|---|---|---|
| EP | 2027390 B1 | 12/2011 |
| EP | 2484895 A1 | 8/2012 |
| EP | 2799710 A1 | 11/2014 |
| JP | 6154050 B1 | 6/2017 |
| WO | 2006/122547 A1 | 11/2006 |
| WO | 2007/114698 A2 | 10/2007 |
| WO | 2007/140771 A1 | 12/2007 |
| WO | 2013/014082 A2 | 1/2013 |
| WO | 2015/030573 A1 | 3/2015 |

OTHER PUBLICATIONS

Extended European Search Report for European Application No. 18171891.7 dated Jan. 4, 2019; 7pp.
Corrected Extended European Search Report Opinion for European Application No. 18171891.7 dated Jan. 24, 2019; 4pp.

* cited by examiner

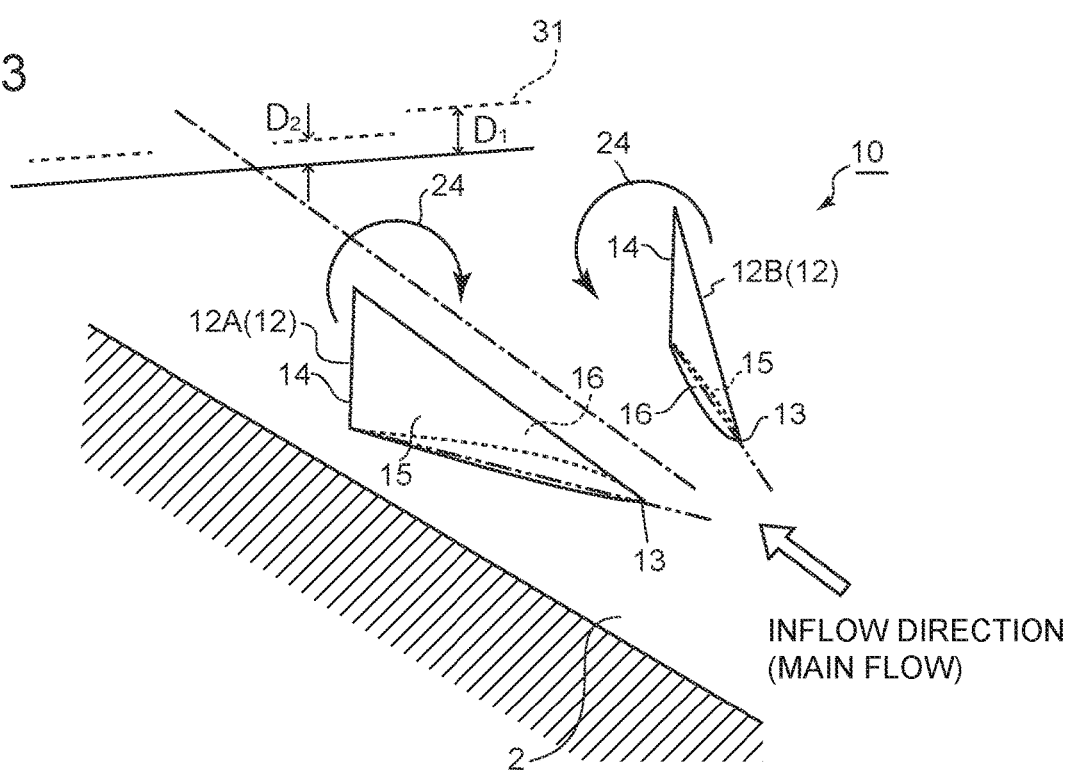

BLADE SPANWISE DIRECTION

METHOD FOR DETERMINING ARRANGEMENT POSITION OF VORTEX GENERATOR ON WIND TURBINE BLADE, METHOD FOR PRODUCING WIND TURBINE BLADE ASSEMBLY, AND WIND TURBINE BLADE ASSEMBLY

RELATED APPLICATIONS

The present application claims priority to Japanese Application Number 2017-131771, filed Jul. 5, 2017, the disclosure of which is hereby incorporated by reference herein in its entirety

TECHNICAL FIELD

The present disclosure relates to a method for determining an arrangement position of a vortex generator on a wind turbine blade, a method for producing a wind turbine blade assembly, and a wind turbine blade assembly.

BACKGROUND ART

Approaches to improve aerodynamic performance of a wind turbine blade have been sought for some time to improve operation efficiency of a wind turbine. In one of the approaches, a vortex generator is disposed on a surface of a wind turbine blade to suppress separation of a flow along the surface of the wind turbine blade.

Patent Documents 1 to 10 disclose a vortex generator having a platform portion to be mounted to a surface of a wind turbine blade, and a fin disposed upright on the platform portion.

CITATION LIST

Patent Literature

Patent Document 1: WO2015/030573A
Patent Document 2: EP1944505A
Patent Document 3: WO2007/114698A
Patent Document 4: EP2799710A
Patent Document 5: WO2007/1470771A
Patent Document 6: WO2006/122547A
Patent Document 7: EP2027390A
Patent Document 8: WO2013/014082A
Patent Document 9: EP2484895A
Patent Document 10: EP2201243A

SUMMARY

Meanwhile, if a vortex generator is offset from a suitable position, the influence of drag force of the vortex generator itself dominates the influence of the effect to suppress separation, which may lead to occurrence of drag penalty.

However, Patent Documents 1 to 10 do not disclose a specific method for arranging a vortex generator in a suitable position on the surface of a wind turbine blade.

At least some embodiments of the present invention were made in view of the above issue, and an object of some embodiments is to provide a method for determining an arrangement position of a vortex generator on a wind turbine blade, a method for producing a wind turbine blade assembly, and a wind turbine blade assembly, whereby it is possible to reduce drag penalty due to provision of a vortex generator.

(1) A method for determining an arrangement position of a vortex generator on a wind turbine blade, according to at least one embodiment of the present invention, includes: a step of determining, for a first region of a mounting range of the vortex generator in a blade spanwise direction, an arrangement position of the vortex generator to be an angular position offset by a predetermined angle toward a trailing edge of the wind turbine blade with reference to an inflow angle of wind to the wind turbine blade; and a step of determining, for a second region of the mounting range closer to a blade tip than the first region, the arrangement position of the vortex generator to be a position between a separation position of a flow on a surface of the wind turbine blade under a rated wind speed condition and a transition position of the flow on the surface of the wind turbine blade under a variable speed operation condition of a wind turbine including the wind turbine blade.

The "angular position", which is a criteria for determining the arrangement position of the vortex generator in the first region, is defined by an angle in a rotational coordinate system centered at the pitch axis of the wind turbine blade.

A suitable airfoil shape is normally selected for a wind turbine blade depending on the blade spanwise direction. In a typical wind turbine blade, the ratio of the blade thickness to the chord length (blade thickness ratio) increases toward the blade root. For such variation of the airfoil shape, a suitable determination criteria for mounting a vortex generator also varies between the first region closer to the blade root and the second region closer to the blade tip, in the mounting range of the vortex generator.

In this regard, in the above method (1), in the first region closer to the blade root, the angle used as a criteria is an inflow angle of wind to the wind turbine blade, when determining the arrangement position of the vortex generator. Thus, for the first region having an airfoil shape such that the blade thickness ratio is relatively great compared to the second region on the blade tip side and it is difficult to predict the transition position and the separation position accurately, it is possible to determine the arrangement position of the vortex generator on the surface of the wind turbine blade.

Furthermore, in the above method (1), the arrangement position of the vortex generator is determined, for the second region closer to the blade tip than the first region, to be a position between the separation position of a flow on the surface of the wind turbine blade under a rated wind speed condition and the transition position of a flow on the surface of the wind turbine blade under a variable speed operation condition of a wind turbine including the wind turbine blade. Accordingly, it is possible to determine the arrangement position of the vortex generator to be a suitable position taking into account the difference in the attack angle between the rated wind speed condition and the variable speed operation condition, and thus it is possible to reduce drag penalty due to provision of the vortex generator while suppressing separation of a flow along a surface of the wind turbine blade in the second region.

As described above, according to the above method (1), the arrangement position of the vortex generator is determined on the basis of different perspectives for the first region and the second region, and thus it is possible to determine the arrangement position of the vortex generator so as to maintain a high lift-drag ratio, taking into account the difference between the airfoil shape in the first region and the airfoil shape in the second region.

(2) In some embodiments, the above method (1) further includes: a step of obtaining the separation position under the rated wind speed condition by calculation based on hydrodynamics under a condition where the transition position of the flow on the surface of the wind turbine blade is fixed to a leading edge of the wind turbine blade; and a step of obtaining the transition position of the flow on the surface of the wind turbine blade by calculation based on hydrodynamics under the variable speed operation condition.

The surface of the wind turbine blade becomes less smooth due to degradation with age, and the roughness of the blade surface tends to increase gradually. Thus, as compared to the blade normal state in which the blade surface is smooth, in the blade degradation state in which the roughness of the blade surface is relatively high, the transition position and the separation position of a flow along the blade surface are offset toward the leading edge.

In this regard, the above method (2) includes calculating the separation position in a case where the transition position under the rated wind speed condition is fixed to the leading edge assuming the blade degradation state, and the transition position under the variable speed operation condition assuming the blade normal condition. The arrangement position of the vortex generator is determined to be between the separation position and the transition position obtained as described above, and thereby it is possible to enjoy the effect of the vortex generator to improve the lift-drag ratio, regardless of the degradation state of the wind turbine blade.

(3) In some embodiments, in the above method (1) or (2), the step of determining the arrangement position of the vortex generator for the second region includes determining the arrangement positon of the vortex generator in the second region to be closer to the leading edge than the separation position and closer to the trailing edge than the transition position.

According to the above method (3), the arrangement position of the vortex generator is closer to the leading edge than the separation position under the rated wind speed condition, and thus it is possible to suppress separation of a flow along the surface of the wind turbine blade even in a case where the attack angle increases with an increase in the wind speed (e.g. in a case of the rated wind speed condition). Furthermore, according to the above method (3), with the arrangement position of the vortex generator being closer to the trailing edge than the transition position under the variable speed operation condition, it is possible to reduce drag penalty due to provision of the vortex generator while suppressing separation of a flow along a surface of the wind turbine blade, under the variable speed operation condition in which drag penalty may increase drag.

(4) In some embodiments, in any one of the above methods (1) to (3), an angle between the inflow angle and the angular position of the vortex generator determined for the first region is not smaller than 60 degrees and not greater than 90 degrees.

According to findings of the present inventors, in the first region where the blade thickness ratio is relatively great compared to the second region on the blade tip side, when the vortex generator is arranged in a position offset by an angle of approximately 60 degrees to 90 degrees toward the trailing edge with reference to the inflow angle of wind, it is possible to achieve a high effect to improve the lift-drag ratio with the vortex generator.

The above method (4) is based on the above findings of the present inventors, and it is possible to achieve a high effect to improve the lift-drag ratio with the vortex generator in the first region, even if the airfoil shape in the first region has a great blade thickness ratio which makes it difficult to accurately predict the transition position and the separation position.

(5) In some embodiments, in any one of the above methods (1) to (4), the first region is a region where a maximum blade thickness ratio tmax/C of a maximum blade thickness tmax to a chord length C is not smaller than 60%.

According to the above method (5), even in a case where the maximum blade thickness ratio tmax/C in the first region is not smaller than 60% and it is difficult to predict the separation position and the transition position accurately in the first region, it is possible to achieve a high effect to improve the lift-drag ratio with the vortex generator in the first region by determining the angular position for the vortex generator in the first region with reference to the inflow angle of wind as described in the above (1).

(6) In some embodiments, in any one of the above methods (1) to (5), the arrangement position of the vortex generator is determined so that a ratio x/C of a chordwise directional position x from the leading edge to a chord length C is not greater than 60% at a blade spanwise directional position in the mounting range.

The difference between the boundary layer thickness in the blade degradation state and the boundary layer thickness in the blade normal state increases toward the trailing edge. Accordingly, in the trailing-edge side region where the boundary layer thickness varies considerably between the blade degradation state and the blade normal state, the desirable dimensions of the vortex generator also vary considerably between the blade degradation state and the blade normal state. Thus, it is difficult to design a vortex generator capable of achieving a high lift-drag ratio under any condition.

Thus, in the above method (6), the trailing-edge side limit of the arrangement position of the vortex generator along the chordwise direction is set to be 60% from the leading edge. As a result, it is possible to reduce drag penalty caused by provision of the vortex generator, while suppressing separation of a flow along the surface of the wind turbine blade, in both of the blade degradation state and the blade normal state.

(7) In some embodiments, in any one of the above configurations (1) to (6), the arrangement position of the vortex generator is determined so that a ratio x/C of a chordwise directional position x to a chord length C is not smaller than 5% at a blade spanwise directional position in the mounting range.

According to the above method (7), with the arrangement position of the vortex generator being determined so that x/C is not smaller than 5%, it is possible to reduce drag penalty due to provision of the vortex generator.

(8) In some embodiments, in any one of the above methods (1) to (7), a blade-root side end portion of the mounting range is positioned closer to the blade tip than a 5% position of a blade length L of the wind turbine blade from the blade root in the blade spanwise direction.

According to the above method (8), with the vortex generator being disposed in the range closer to the blade tip than the 5% position of the blade length L from the blade root, where contribution to the output of the wind turbine can be expected, it is possible to gain the technical benefit of provision of the vortex generator effectively while reducing the installation cost of the vortex generator.

(9) In some embodiments, in any one of the above configurations (1) to (8), the arrangement position of the vortex generator is determined so that a mounting angle of the vortex generator with reference to the leading edge increases toward the blade tip, in an angular range between a first position on a suction surface of the wind turbine blade offset by 20 degrees toward the trailing edge with reference to the leading edge and a second position on the suction surface offset by 160 degrees toward the trailing edge with reference to the leading edge, at a blade spanwise directional position in the mounting range.

Accordingly, in the above method (9), the mounting angle of the vortex generator with reference to the leading edge increases toward the blade tip, and thus it is possible to realize an appropriate arrangement of the vortex generator taking into account the changing trend of the attack angle with respect to the blade spanwise directional position (i.e., the trend of the attack angle to decrease toward the blade tip). Furthermore, by setting the mounting angle of the vortex generator with reference to the leading edge to be in the above numerical range (not smaller than 20 degrees and not greater than 160 degrees with reference to the leading edge), it is possible to achieve a high lift-drag ratio.

(10) In some embodiments, in any one of the above methods (1) to (9), the vortex generator includes a plurality of fin sets formed by a pair of fins each having a pressure surface and a suction surface, and arranged so that the suction surfaces face each other. In the mounting range, the vortex generator is arranged so that a ratio Z/S of an arrangement pitch Z of adjacent two of the fin sets to an interval S of trailing edges of the pair of fins is not smaller than 1.5 and not greater than 3.0.

To enhance the effect to suppress separation, it is desirable to arrange the vortex generators densely. On the other hand, to reduce drag, it is desirable to arrange the vortex generators less densely. Thus, as in the above method (10), by arranging the vortex generators with a density such that Z/S is not smaller than 1.5 and not greater than 3.0, it is possible to achieve both of the effect to suppress separation and the effect to reduce drag at the same time.

(11) In some embodiments, in any one of the above methods (1) to (10), the vortex generator includes a pair of fins arranged line-symmetrically with respect a segment along a chordwise direction of the wind turbine blade.

According to the above method (11), it is possible to arrange the vortex generator in an appropriate direction with respect to the inflow direction of wind, and to stabilize generation of vortices by the vortex generator.

(12) A method for producing a wind turbine assembly including a wind turbine blade and a vortex generator mounted to the wind turbine blade, according to at least one embodiment of the present invention, includes: a step of determining an arrangement position of the vortex generator on the wind turbine blade by the method according to any one of the above (1) to (11); and a step of mounting the vortex generator to the wind turbine blade at the arrangement position.

According to the above producing method (12), it is possible to arrange the vortex generator in a suitable position, and thus it is possible to reduce drag penalty due to provision of the vortex generator while suppressing separation of a flow along a surface of the wind turbine blade.

(13) In some embodiments, in the above producing method (12), the vortex generator includes: a plurality of fins; and a platform portion to be mounted to a surface of the wind turbine blade, the platform portion including a front surface on which the plurality of fins are disposed upright and a flat bottom surface opposite to the front surface. The step of mounting the vortex generator includes mounting the vortex generator to the wind turbine blade in a state where the vortex generator is oriented so that a cross sectional shape at the platform portion along the blade spanwise direction is a curved convex shape.

With the wind turbine blade assembly obtained by the above method (13), the platform portion of the vortex generator has a cross section of a curved convex shape along the blade spanwise direction, and thereby the platform portion is deformable in accordance with bending deformation of the wind turbine blade, which makes it possible to disperse stress generated at the platform portion. Thus, it is possible to reduce a risk of falling off of the vortex generator from the surface of the wind turbine blade.

(14) In some embodiments, in the above producing method (12) or (13), the vortex generator includes a pair of fins each including a suction surface having a curved convex shape, and arranged so that the suction surfaces face each other, and the step of mounting the vortex generator includes mounting the vortex generator to the wind turbine blade in a state where the vortex generator is oriented such that fin chords of each of the fins are oblique with respect to a chordwise direction of the wind turbine blade.

According to the above producing method (14), it is possible to arrange the vortex generator in an appropriate direction with respect to the inflow direction of wind, and to stabilize generation of vortices by the vortex generator.

(15) A wind turbine blade assembly according to at least one embodiment of the present invention includes: a wind turbine blade; and a vortex generator mounted to a surface of the wind turbine blade. In a first region of a mounting range of the vortex generator in a blade spanwise direction, the vortex generator is arranged at an angular position offset by a predetermined angle toward a trailing edge of the wind turbine blade with reference to an inflow angle of wind to the wind turbine blade. In a second region of the mounting range closer to a blade tip than the first region, the vortex generator is arranged at a position between a separation position of a flow on a surface of the wind turbine blade under a rated wind speed condition and a transition position of the flow on the surface of the wind turbine blade under a variable speed operation condition of a wind turbine including the wind turbine blade.

As described above, the airfoil shape varies depending on the blade spanwise directional position, and thus a suitable determination criteria for mounting a vortex generator also varies between the first region closer to the blade root and the second region closer to the blade tip, in the mounting range of the vortex generator.

In this regard, with the above configuration (15), the vortex generator in the first region closer to the blade root is arranged at an angular position with reference to an inflow angle of wind to the wind turbine blade. Thus, in the first region having an airfoil shape such that the blade thickness ratio is relatively great compared to the second region on the blade tip side and it is difficult to predict the transition position and the separation position accurately, it is possible to arrange the vortex generator in an appropriate position.

Furthermore, with the above configuration (15), in the second region closer to the blade tip than the first region, the vortex generator is disposed between the separation position of a flow on the surface of the wind turbine blade under a rated wind speed condition and the transition position of a flow on the surface of the wind turbine blade under a variable speed operation condition of a wind turbine including the wind turbine blade. Accordingly, the vortex generator is arranged at a suitable position taking into account the difference in the attack angle between the rated wind speed condition and the variable speed operation condition, and thus it is possible to reduce drag penalty due to provision of the vortex generator while suppressing separation of a flow along a surface of the wind turbine blade in the second region.

As described above, with the above configuration (15), it is possible to determine the arrangement position of the vortex generator so as to maintain a high lift-drag ratio, taking into account the difference between the airfoil shape in the first region and the airfoil shape in the second region.

According to at least one embodiment of the present invention, provided is a method of determining an arrangement position of a vortex generator on a wind turbine blade, a method of producing a wind turbine blade assembly, and a wind turbine blade assembly, whereby it is possible to reduce drag penalty due to provision of a vortex generator.

BRIEF DESCRIPTION OF DRAWINGS

FIG. 3 is a perspective view for describing a flow around fins of a vortex generator according to an embodiment.

FIG. 10A is a graph showing a relationship between upstream wind velocity and rotation speed of a wind turbine. FIG. 10B is a graph showing a relationship between upstream wind velocity and tip speed ratio. FIG. 10C is a graph showing a relationship between upstream wind velocity and wind turbine output. FIG. 10D is a graph showing a relationship between upstream wind velocity and attack angle.

FIG. 11A is a diagram showing a transition position and a separation position under a variable speed operation condition. FIG. 11B is a diagram showing a transition position and a separation position under a rated speed operation condition.

FIG. 14A is a cross-sectional view of a blade root side, and FIG. 14B is a cross-sectional view of a blade tip side.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
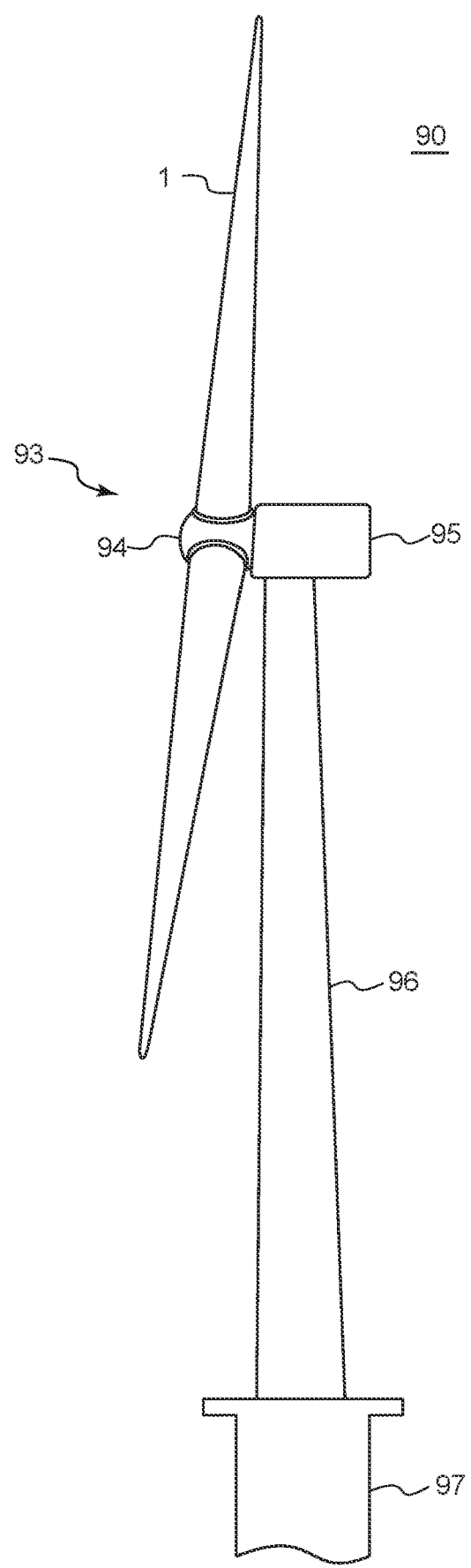
FIG. 1 is a schematic configuration diagram of a wind turbine power generating apparatus according to an embodiment.
Figure 2A:
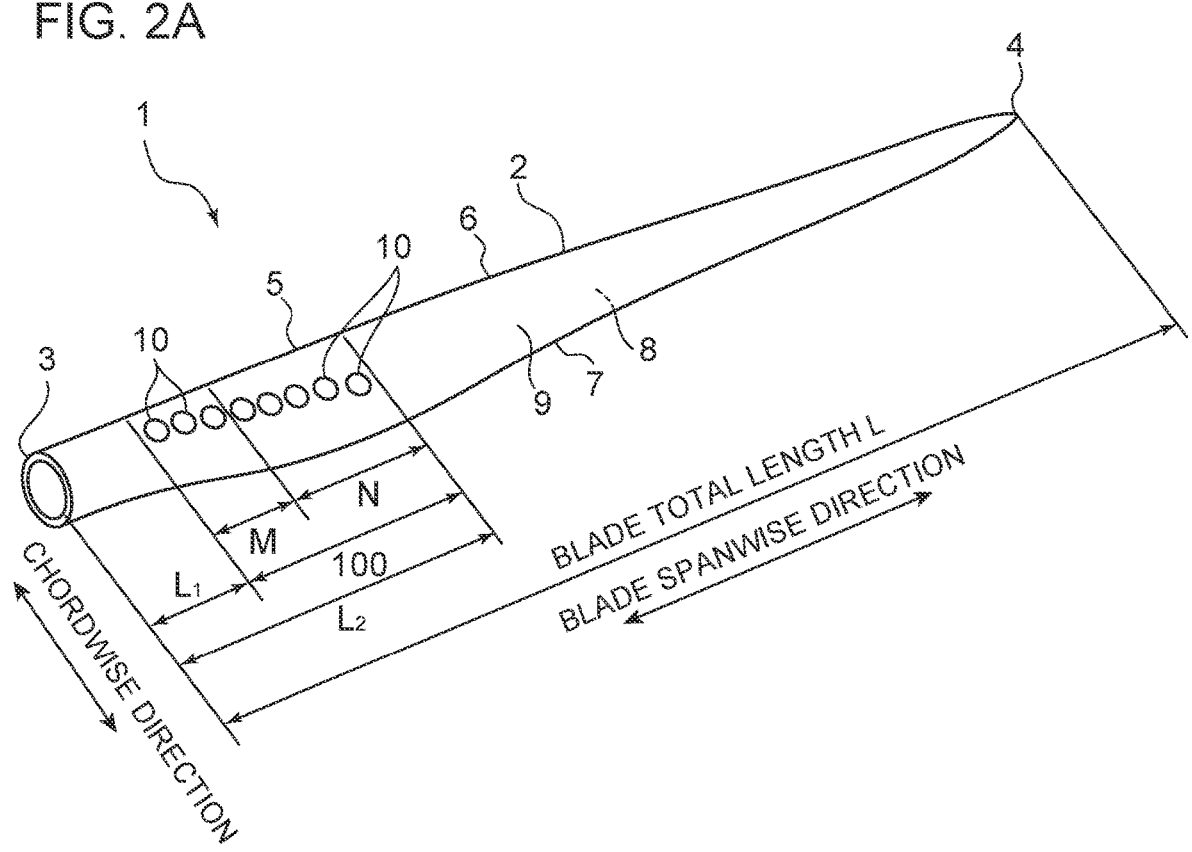
FIG. 2A is a perspective view of a wind turbine blade assembly including a vortex generator according to an embodiment.

With reference to FIGS. 1 and 2A, overall configuration of a wind turbine blade and a wind turbine power generating apparatus to which a vortex generator according to some embodiments is to be applied will be described. FIG. 1 is a schematic configuration diagram of a wind turbine power generating apparatus according to an embodiment. FIG. 2A is a perspective view of a wind turbine blade to which a method for determining an arrangement position of a vortex generator according to an embodiment is to be applied.

As shown in FIG. 1, a wind turbine power generating apparatus 90 includes at least one (e.g. three) wind turbine blade assemblies 1. The wind turbine blade assemblies 1 include a wind turbine blade 2 and a vortex generator 10. The wind turbine blade assemblies 1 are mounted to a hub 94 in a radial fashion, and the wind turbine blade assemblies 1 and the hub 94 constitute a rotor 93 of the wind turbine power generating apparatus 90. The rotor 93 rotates in response to wind received by the wind turbine blade assemblies 1, and a generator (not depicted) coupled to the rotor 93 generates electric power.

In the embodiment depicted in FIG. 1, the rotor 93 is supported by a nacelle 95 disposed on an upper part of a tower 96. The tower 96 is disposed to stand upright on a base structure 97 (e.g. foundation structure or floating structure) disposed on water or on land.

As described below, according to a method for determining an arrangement position of a vortex generator according to an embodiment, a vortex generator 10 is mounted to the wind turbine blade 2 of the wind turbine assembly 1, in the wind turbine power generating apparatus 90 having the above configuration.

As shown in FIG. 2A, the wind turbine blade assembly 1 includes a wind turbine blade 2. According to a method for determining an arrangement position according to an embodiment, the vortex generator 10 is arranged on the surface (blade surface) of the wind turbine blade 2. In FIG. 2A, the vortex generator 10 is already mounted to the wind turbine blade assembly 1.

The wind turbine blade 2 includes a blade root 3 to be mounted to the hub 94 of the wind turbine power generating apparatus 90, a blade tip 4 positioned farthest from the hub 94, and an airfoil part 5 extending between the blade root 3 and the blade tip 4. The wind turbine blade 2 has a leading edge 6 and a trailing edge 7 from the blade root 3 to the blade tip 4. Further, an exterior shape of the wind turbine blade 2 is formed by a pressure surface 8 and a suction surface 9 disposed opposite to the pressure surface 8.

As shown in FIG. 2A, in the wind turbine blade assembly 1, a plurality of vortex generators 10 are mounted to the suction surface 9 of the wind turbine blade 2. Furthermore, the plurality of vortex generators 10 are mounted to the suction surface 9 of the wind turbine blade 2 in a blade spanwise direction.

Hereinafter, "blade spanwise direction" refers to a direction connecting the blade root 3 and the blade tip 4, and "blade chordwise direction" refers to a direction along a line (chord) connecting the leading edge 6 and the trailing edge 7 of the wind turbine blade 2.

An aerodynamic function of the vortex generator 10 will now be described briefly. FIG. 3 is a perspective view for describing function of the vortex generator 10. In FIG. 3, only a pair of adjacent fins 12A, 12B is depicted, from among a fin row (a plurality of pairs of fins 12A, 12B) formed by arranging a plurality of vortex generators 10 shown in FIGS. 4 and 5 described below, in the blade spanwise direction of the wind turbine blade 2.

Separation of a flow at the suction surface 9 of the wind turbine blade 2 takes place due to a boundary layer becoming gradually thicker from a streamline flow region in the vicinity of the leading edge 6 toward a turbulent flow region downstream thereof, and the flow being separated before arriving at the trailing edge 7.

As shown in FIG. 3, the vortex generator 10 mounted to the wind turbine blade 2 normally generates longitudinal vortices 24 on the side of the suction surface 16 of the fin 12 with a lift produced by the fin 12. These longitudinal vortices 24 promote momentum exchange between outside and inside of a boundary layer 31 at a wake-flow side of the fin 12. Accordingly, in the region between the suction surfaces 16 of the adjacent fins 12, the thickness D of the boundary layer 31 of wake of the fins 12 decreases. Thus, with the plurality of fins 12 arranged in the blade spanwise direction, the boundary layer 31 at the surface of the wind turbine blade 2 becomes thin as a whole, which suppresses trailing edge separation of the wind turbine blade 2.

It should be noted that longitudinal vortices 24 refer to vortices formed in the height direction of the fins 12.

Figure 4:
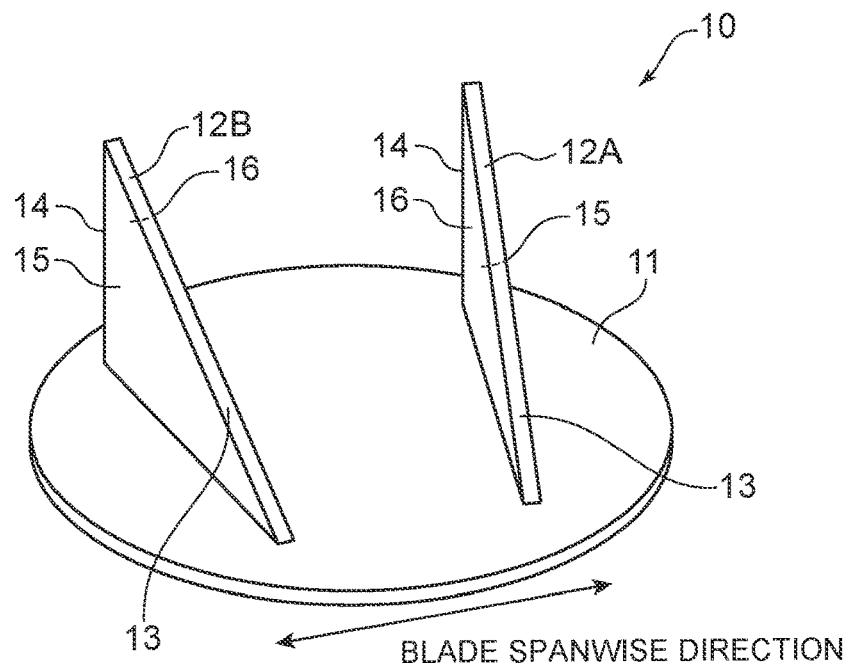
FIG. 4 is a perspective view of a vortex generator according to an embodiment.
Figure 5:
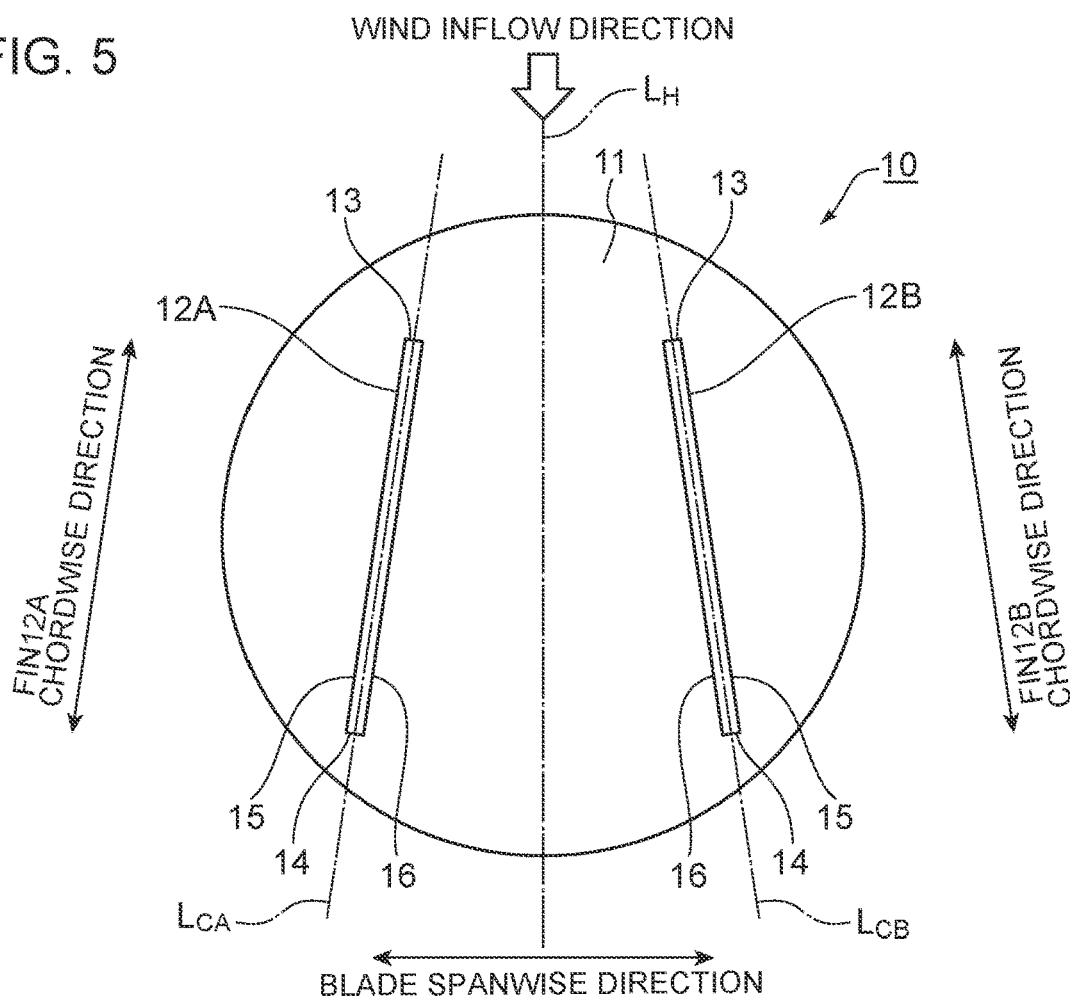
FIG. 5 is a top view of a vortex generator according to an embodiment.
Figure 6:
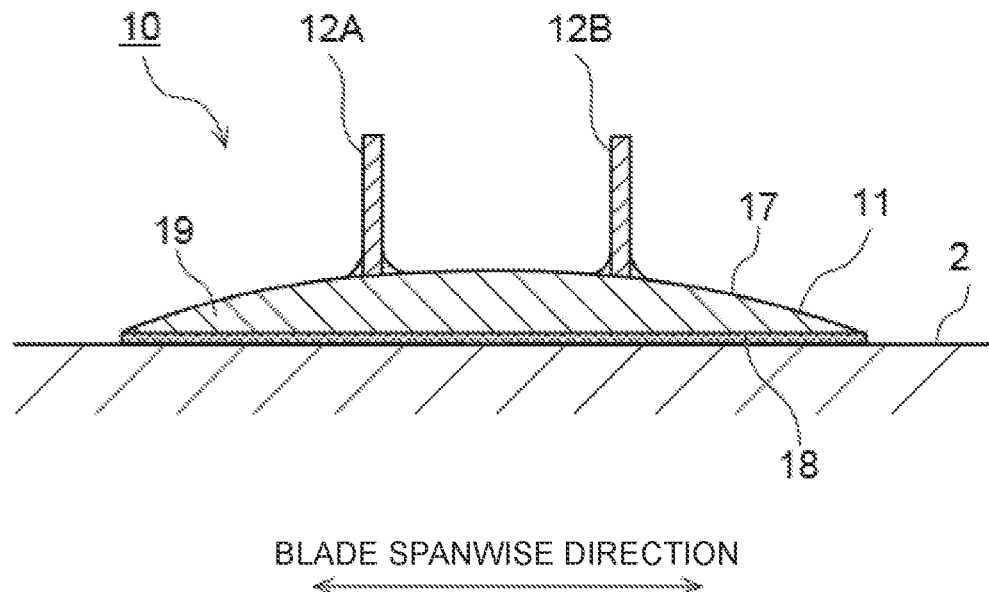
FIG. 6 is a cross-sectional view of a vortex generator according to an embodiment, taken along the blade spanwise direction.
Figure 7:
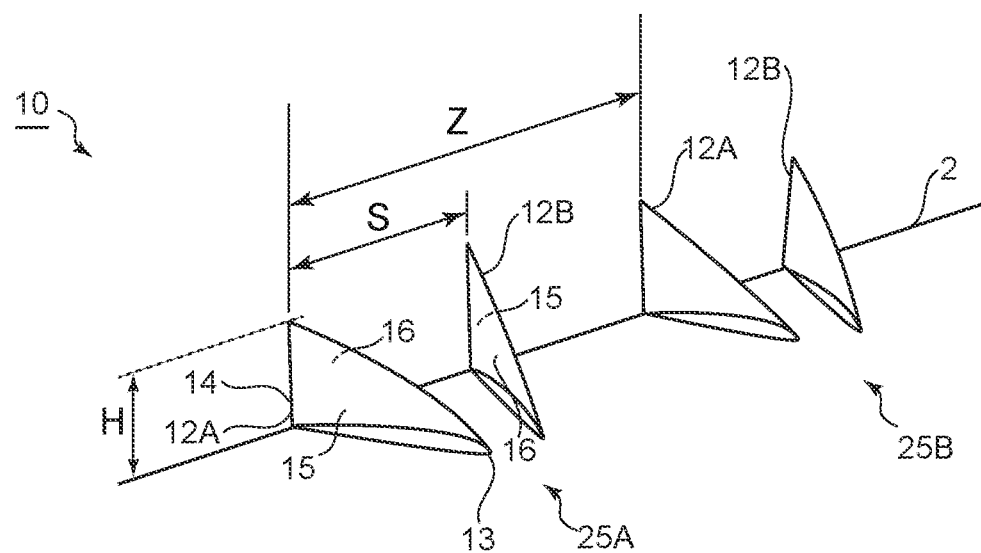
FIG. 7 is a perspective view of a vortex generator according to an embodiment.

Next, the configuration the vortex generator 10 will be described in detail with reference to FIGS. 4 to 7. FIG. 4 is a perspective view of a vortex generator according to an embodiment. FIG. 5 is a top view of a vortex generator according to an embodiment. FIG. 6 is a cross-sectional view of a vortex generator according to an embodiment, taken along the blade spanwise direction. FIG. 7 is a perspective view of a vortex generator according to an embodiment.

As shown in FIG. 4, the vortex generator 10 according to some embodiments includes a platform portion 11 fixed to a surface of the wind turbine blade 2 (more specifically, to a surface of the blade body 2) and at least one fin 12 disposed upright on the platform portion 11. In the embodiment shown in FIGS. 4 to 6, the vortex generator 10 includes a pair (two in total) of fins 12 (12A, 12B) disposed so as to be adjacent to each other on the platform portion 11.

In the embodiment shown in FIGS. 4 and 5, the platform portion 11 has a circular shape in a top view.

In some embodiments, the platform portion 11 may have a shape other than a circular shape. For instance, the platform portion 11 may have an oval shape, or a polygonal shape such as a rectangular shape.

Furthermore, as shown in FIG. 7 as an example, in some embodiments, the vortex generator 10 may not necessarily include the platform portion 11, and the fin 12 may be directly mounted to the wind turbine blade 2.

In some embodiments, as shown in FIG. 5, the fin 12 is disposed on the wind turbine blade 2 such that the extension lines $LC_A$ and $LC_B$ of the fin chords form a predetermined angle with the line $L_H$ along the chordwise direction of the wind turbine blade 2.

In FIG. 5, each of the fins 12A, 12B is disposed so that the gap between the pair of fins 12A, 12B widens from upstream toward downstream with respect to the inflow direction of wind (i.e., from the side of the leading edge 6 toward the side of the trailing edge 7 of the wind turbine blade 2 (see FIG. 2A), in a state where the vortex generator 10 is mounted to the wind turbine blade 2).

In some embodiments, each of the fins 12A, 12B may be disposed so that a gap between the pair of fins 12A, 12B widens from downstream toward upstream with respect to the inflow direction of wind (i.e., from the side of the trailing edge 7 toward the side of the leading edge 6 of the wind turbine blade 2 (see FIG. 2A) in a state where the vortex generator 10 is mounted to the wind turbine blade 2).

Furthermore, in an embodiment, the fins 12 may be disposed on the wind turbine blade 2 such that the line $L_H$ along the chordwise direction of the wind turbine blade 2 bisects the angle formed by the extension lines $L_{CA}$ and $L_{CB}$ of a pair of fin chords.

As described above, with reference to the chord of the wind turbine blade 2 along the wind inflow direction, the vortex generator 10 is arranged at an angle with respect to the fin chord. Accordingly, it is possible to mount the vortex generator 10 to the wind turbine blade 2 in a mounting direction suitable to enhance the effect to suppress separation, with respect to the wind inflow direction.

In FIG. 6, depicted is a cross section 19 of the platform portion 11 of the vortex generator 10 taken along the blade spanwise direction. As shown in FIG. 6, in the vortex generator 10 according to some embodiments, the platform portion 11 has a front surface 17 exposed to outside, and a back surface 18 opposite to the front surface of the wind turbine blade 2. As shown in FIG. 6, in some embodiments, the vortex generator 10 is arranged on the wind turbine blade 2 while being oriented such that the cross sectional shape of the platform portion 11 has a curved convex shape along the blade spanwise direction.

Herein, "curved convex shape" refers to a shape that bulges in a direction away from the wind turbine blade 2 to have, at least partially, a bulged portion with a curved profile (the shape of the front surface 17 of the platform portion 11).

The profile of the bulged portion may be formed by an arc having a single curvature radius as in the embodiment depicted in FIG. 6, or may be formed by combination of a plurality of arcs having different curvature radii, or combination of arcs having one or more curvature radii and one or more straight lines, in another non-depicted embodiment.

During operation of the wind turbine power generating apparatus 90, the wind turbine blade 2 deforms flexurally due to bending deformation caused by an aerodynamic load. Thus, a great stress is applied to the platform portion 11 of the vortex generator 10 mounted to the surface of the wind turbine blade 2. In this regard, with the above embodiment, the platform portion 11 of the vortex generator 10 has a cross section of a curved convex shape along the blade spanwise direction of the wind turbine blade 2, and thereby the platform portion is deformable in accordance with bending deformation of the wind turbine blade 2, which makes it possible to disperse stress generated at the platform portion 11.

FIG. 7 is a perspective view of the vortex generator 10 mounted to the wind turbine blade 2. As shown in FIG. 7, the vortex generator 10 according to some embodiments includes a plurality of fin sets 25 each formed by a pair of fins (12A, 12B), the fins each having a pressure surface 15 and a suction surface 16 and being arranged such that the respective suction surfaces 16 face each other. In some embodiments, the vortex generator 10 is arranged such that a ratio Z/S of the arrangement pitch Z of the adjacent fin sets (25A, 25B) to the interval S of the trailing edges 14 of the pair of fins (12A, 12B) is not smaller than 1.5 and not greater than 3.0.

To enhance the effect to suppress separation, it is desirable to arrange the vortex generators 10 densely. On the other hand, to reduce drag force, it is desirable to arrange the vortex generators 10 less densely. Thus, by arranging the vortex generators 10 with a density such that Z/S is not smaller than 1.5 and not greater than 3.0 as described above, it is possible to achieve both of the effect to suppress separation and the effect to reduce drag force at the same time.

Figure 8:
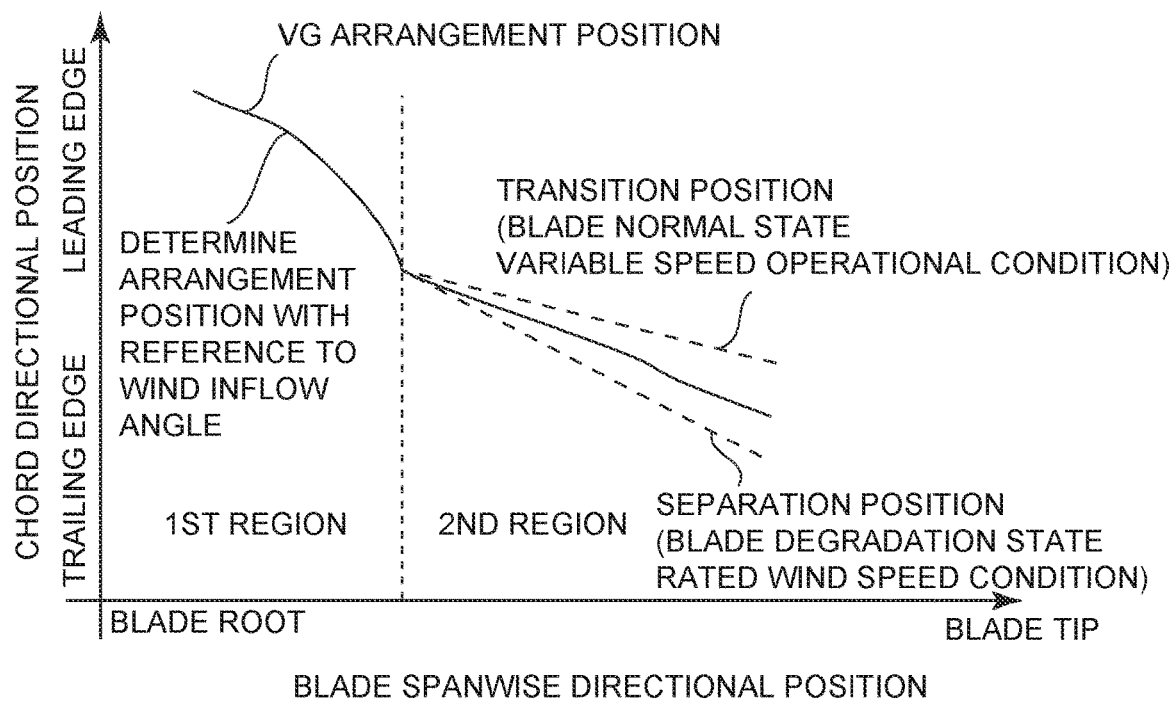
FIG. 8 is a graph showing an arrangement position of a vortex generator in the first region and the second region according to an embodiment.

Next, a method for determining an arrangement position of the vortex generator 10 on the wind turbine blade 2 according to some embodiments will be described in detail with reference to FIGS. 2 and 8. FIG. 8 is a graph showing an arrangement position of the vortex generator 10 in the first region and the second region according to an embodiment.

In some embodiments, as shown in FIG. 2A, provided that the mounting range 100 of the vortex generator 10 includes the first region M and the second region N closer to the blade tip than the first region M with respect to the blade spanwise direction, the arrangement position of the vortex generator 10 is determined by a method suitable for each region (M, N).

The method for determining an arrangement position of the vortex generator 10 in each of the first region M and the second region N will be described in detail. First, the mounting range 100 of the vortex generator 10 including the first region M and the second region N will be described in detail.

In an embodiment, as shown in FIG. 2A for example, the end portion on the blade root side of the mounting range 100 is positioned at a distance $L_1$ from the blade root 3. The value of $L_1$ is, using the blade length L of the wind turbine blade 2, not smaller than 0.05 L.

In this case, the vortex generator 10 is disposed in the mounting range 100 being a region closer to the blade tip than the 5% position of the blade length L from the blade root 3, where contribution to the output of the wind turbine power generating apparatus 90 can be expected. In this way, it is possible to gain the technical benefit of the vortex generator 10 effectively while reducing the installation cost of the vortex generator 10.

Figure 2B:
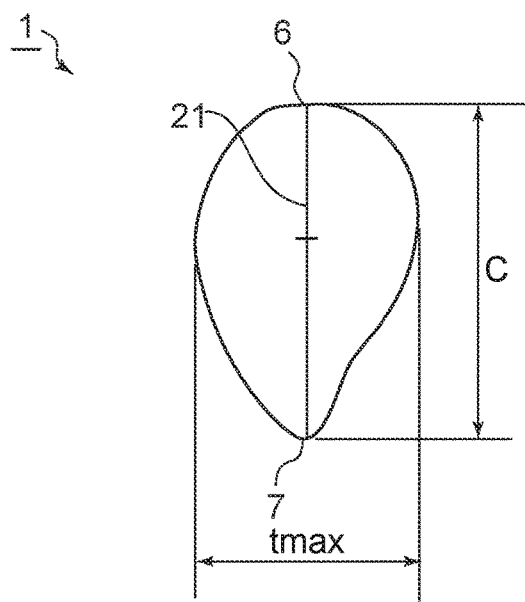
FIG. 2B is a cross sectional view of a wind turbine blade assembly shown in FIG. 2A.

FIG. 2B is a cross-sectional view of a blade in a blade spanwise direction. In an embodiment, the first region M is set to be a region where the maximum blade thickness ratio tmax/C, which is a ratio of the maximum blade thickness tmax to the chord length C, is not less than 60%.

As described below, in the first region M, the angular position of the vortex generator 10 is determined with reference to the inflow angle of wind to the wind turbine blade 2. Thus, with the first region M being set to be a region where the maximum blade thickness ratio tmax/C is not less than 60%, it is possible to achieve, with the vortex generator 10, a high effect to improve the lift-drag ratio in the first region M, where the maximum blade thickness ratio is high and it is difficult to predict the transition position and the separation position accurately.

The mounting range 100 of the vortex generator 10 may include a region other than the first region M and the second region N determined as described above. For instance, the first region M and the second region N may not necessarily be disposed next to each other as shown in FIGS. 2A and 7, and a third region may be interposed between the first region M and the second region N. In an embodiment, arrangement position of the vortex generator 10 in the third region may be determined to be on a line connecting the arrangement position of the first region at an end portion closer to the blade tip and the arrangement position of the second region at an end portion closer to the blade root. The mounting range 100 of the vortex generator 10 may include another region on the blade root side of the first region M or the blade tip side of the second region N.

(VG Arrangement Position in the First Region M)

Figure 9A:
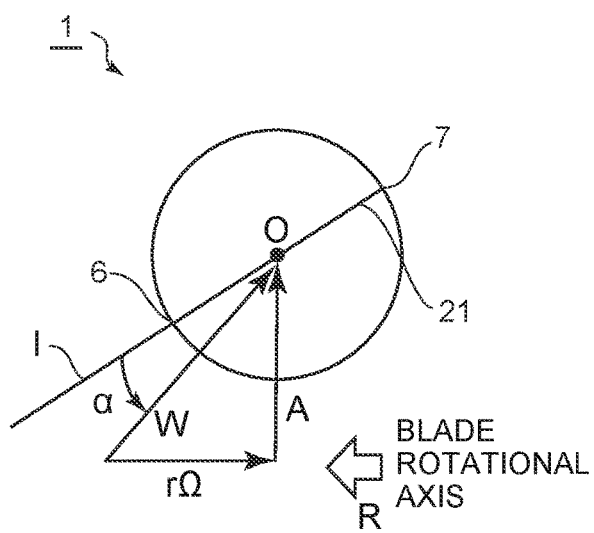
FIG. 9A is a cross sectional view of the wind turbine blade in the first region.
Figure 9B:
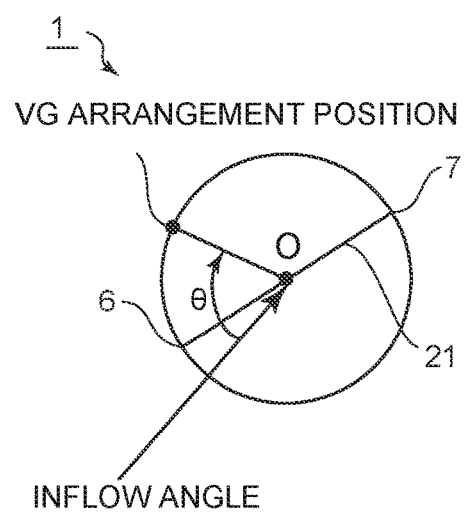
FIG. 9B is a diagram showing an arrangement angle of a vortex generator in the first region according to an embodiment.

A method for determining an arrangement position of the vortex generator 10 in the first region according to some embodiments will be described with reference to FIGS. 9A and 9B. FIGS. 9A and 9B are each a cross sectional view of the wind turbine blade 2 in the first region M. The wind turbine blade 2 in the first region M includes a leading edge 6, a trailing edge 7, and a chord 21.

In FIG. 9A, the relative wind velocity vector W is a velocity vector of wind relative to the wind turbine blade 2 that rotates in the blade rotational direction R, and is a sum of the velocity vector A of wind coming in a direction perpendicular to the rotational direction of the wind turbine blade 2 and the tip speed vector rΩ of the wind turbine blade 2. Further, the angular degree α between the relative wind velocity vector W and the extension line 'l' of the chord 21 of the wind turbine blade 2 is the attack angle of the wind turbine blade 2.

As shown in FIG. 9B, in the first region M, the direction of the relative wind velocity vector W is regarded as the inflow angle of wind, and is referred to as the reference (zero degree). Furthermore, the angular position on the blade surface offset by a predetermined angle θ from the inflow angle toward the trailing edge 7 is determined to be the arrangement position of the vortex generator 10.

Furthermore, in FIGS. 9A, 9B, the origin O, which is the reference of vectors and angles, is positioned at the center axis (pitch axis) of the blade root 3 of the wind turbine blade 2. The blade root 3 of the wind turbine blade 2 has a cylindrical shape, and the position of the center axis of the cylindrical shape (origin O) can be unambiguously defined on a cross section of the wind turbine blade 2 at each blade spanwise directional position.

In this case, in the first region M having an airfoil shape such that the blade thickness ratio is relatively high compared to the second region N on the blade tip side and it is difficult to predict the transition position and the separation position accurately, it is possible to determine the arrangement position of the vortex generator 10 precisely on the surface of the wind turbine blade 2.

In an embodiment, the arrangement angle θ of the vortex generator 10 is not smaller than 60 degrees and not greater than 90 degrees.

According to findings of the present inventors, in the first region M where the blade thickness ratio is relatively high compared to the second region on the blade tip side, when the arrangement angle θ of the vortex generator 10 is set to approximately 60 degrees to 90 degrees, it is possible to achieve a high effect to improve the lift-drag ratio with the vortex generator 10.

In an embodiment, the arrangement position of the vortex generator 10 may be the separation position of a flow along the blade surface based on numerical calculation. At this time, the numerical calculation may be performed by using CFD, or the viscous-inviscid interaction method described below.

In this case, when obtaining the separation position by numerical calculation, the blade degradation state may be modeled by the turbulence transition position of the boundary layer. That is, while analysis of the turbulence transition position (transition point analysis) and analysis of flow are performed at the same time in the blade normal state, in the blade degradation state, analysis may be performed on the premise that turbulence transition occurs at the leading edge of the blade. Furthermore, the operational condition of the wind turbine (variable speed operation condition or rated wind speed condition) may be reproduced by specifying wind velocity, rotation speed, attack angle, and the like for the operational state of the wind turbine.

(VG Arrangement Position in the Second Region N)

Figure 10A:
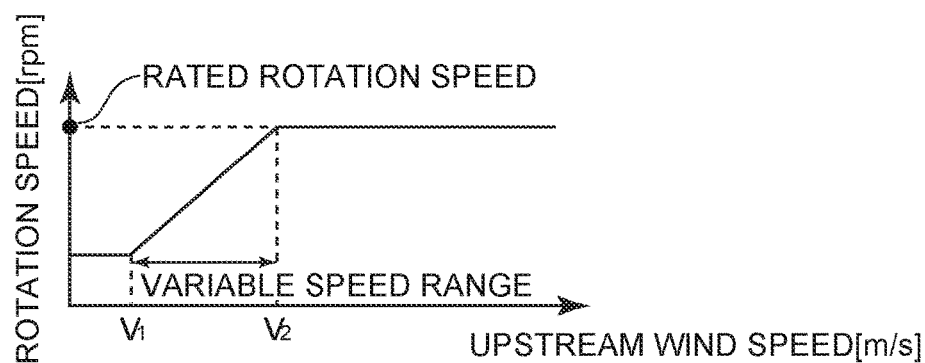
FIGS. 10A to 10D are diagrams showing general operation conditions of a wind turbine.
Figure 10B:
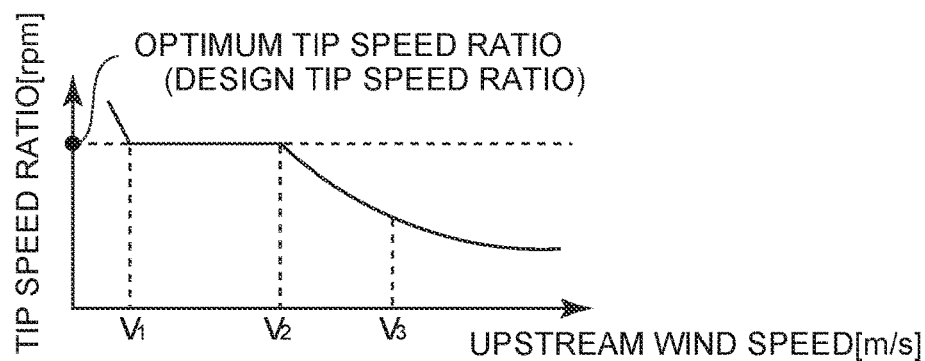
Figure 10C:
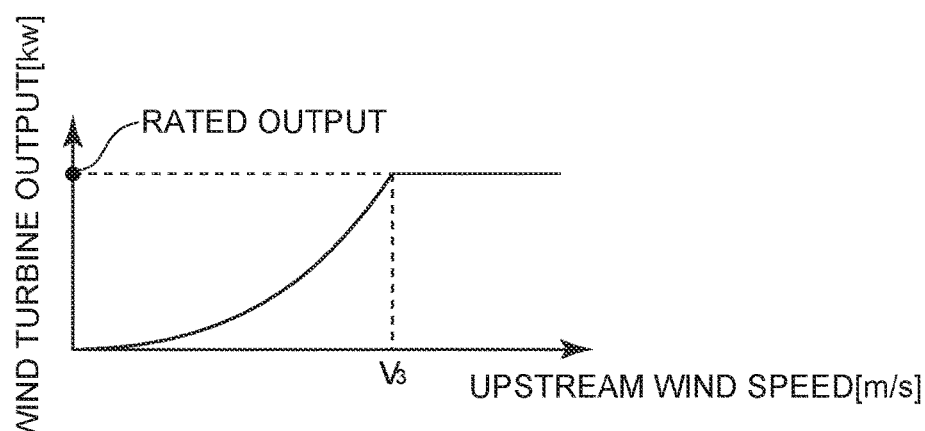
Figure 10D:
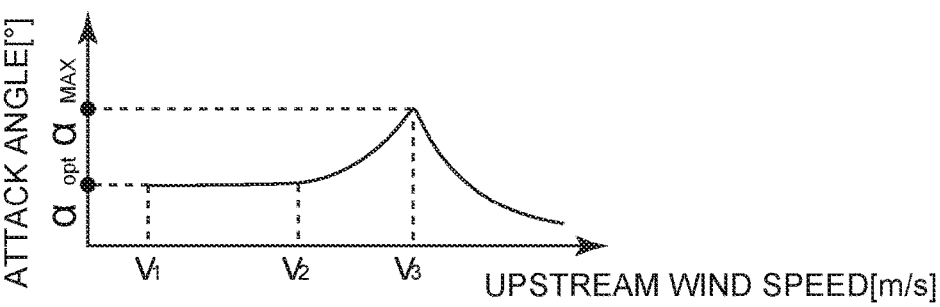
Figure 11A:
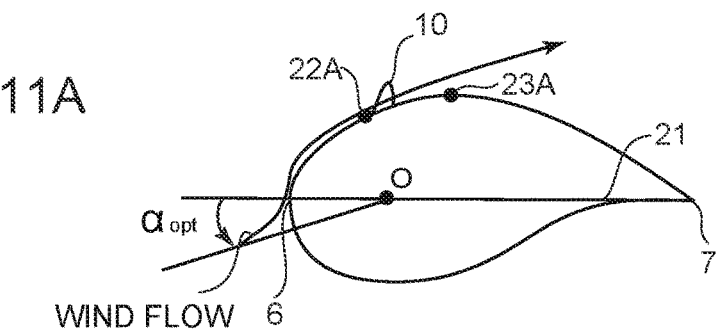
FIGS. 11A and 11B are cross-sectional views of a wind turbine blade assembly according to an embodiment.
Figure 11B:
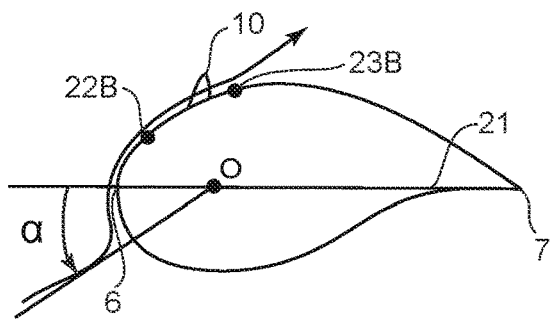

A method for determining an arrangement position of the vortex generator 10 in the second region N according to some embodiments will be described with reference to FIGS. 8, 10A to 10D, 11A and 11B. FIGS. 10A to 10D are each a graph showing an operational condition of a general wind turbine. FIG. 11A shows the cross section of the blade and a flow along the blade surface, under a variable speed operation condition in the second region N according to some embodiments. FIG. 11B shows the cross section of the blade and a flow along the blade surface, under a rated wind speed condition in the second region N according to some embodiments.

First, with reference to FIGS. 10A to 10D, an operational condition of a general wind turbine will be described. FIG. 10A is a graph showing a relationship between upstream wind velocity and rotation speed of a wind turbine. FIG. 10B is a graph showing a relationship between upstream wind velocity and tip speed ratio. FIG. 10C is a graph showing a relationship between upstream wind velocity and wind turbine output. FIG. 10D is a graph showing a relationship between upstream wind velocity and attack angle.

After the wind speed reaches the cut-in wind speed $V_1$ or higher, and until the wind speed reaches the wind speed $V_2$ reaching the rated rotation speed, a normal wind turbine operates at a substantially constant tip speed ratio (optimum tip speed ratio or design tip speed ratio) at which the performance (efficiency) is optimum (maximum) (see FIG. 10B). Herein, the tip speed ratio is represented as (blade tip speed [rpm])/(upstream wind speed [m/s]) by using the wind speed (upstream wind speed) at the infinite upstream side that is not affected by presence of the wind turbine blade. In the variable speed range where the wind speed reaches the cut-in wind speed $V_1$ to the rated rotation speed, the tip speed vector rΩ changes in accordance with a change in the velocity vector A of wind so that the tip speed ratio is maintained at the optimum tip speed ratio (design speed ratio), and the attack angle α is maintained at a substantially constant value suitable for the wind turbine blade (=optimum attack angle $\alpha_{opt}$) (see FIGS. 10B and 10D).

In this regard, after the wind speed reaches the wind speed $V_2$ of reaching the rated rotation speed, the rotation speed is maintained at a constant value (rated rotation speed), and thus the tip speed vector rΩ is maintained substantially at a constant magnitude. Thus, in the high wind speed region between the wind speed $V_2$ reaching the rated rotation speed and the wind speed $V_3$ reaching the rated output, when the wind speed increases, only the velocity vector A of wind increases while the tip speed vector rΩ is maintained at a constant value, and the attack angle α of the wind turbine blade increases (see FIG. 10D). The increasing trend of the attack angle α continues to the wind speed (rated wind speed) $V_3$ at which the wind turbine output reaches the rated output. Further, after reaching the rated wind speed $V_3$, the attack angle α is reduced by the pitch control of the wind turbine blade, and the wind turbine output is maintained at a constant value. Further, the pitch control may be performed between $V_2$ and $V_3$, unlike each condition shown in FIG. 10A to FIG. 10D.

Accordingly, the attack angle α under the rated wind speed condition (wind speed $V_3$) is greater than the attack angle $\alpha_{opt}$ under a variable speed operation condition of the wind turbine (wind speed $V_1$ to $V_2$). That is, the attack angle α in FIG. 11B showing a state under a rated wind speed condition is greater than the attack angle α (optimum attack angle $\alpha_{opt}$) in FIG. 11A showing a state under a variable speed operation condition.

If the attack angle α is relatively large (see FIG. 11B), the transition position and the separation position of a flow along the blade surface shifts toward the leading edge 6 of the wind turbine blade 2, compared to a case in which the attack angle α is small (see FIG. 11A).

As clearly shown in comparison of FIGS. 11A and 11B, under the rated wind speed condition (FIG. 11B), the attack angle α is relatively large, and thus wind enters from a direction closer to the pressure surface compared to FIG. 11A. Thus, the transition position 22B and the separation position 23B under the rated wind speed condition shift toward the leading edge compared to the transition position 22A and the separation position 23A under the variable speed operation condition.

Thus, in some embodiments, as shown in FIG. 11A, the arrangement position of the vortex generator 10 in the second region N is determined to be a position closer to the trailing edge than the transition position 22A under the variable speed operation condition. Furthermore, the arrangement position of the vortex generator 10 in the second region N is determined to be a position closer to the leading edge than the separation position 23B under the rated speed operation condition.

According to the above described embodiment, it is possible to determine an arrangement position of the vortex generator to be a suitable position taking into account the difference in attack angle between the variable speed operation condition and the rated wind speed condition, and thus it is possible to suppress separation of a flow along the surface of the wind turbine blade even in a case where the attack angle increases with an increase in the wind speed, after reaching the rated rotation speed. Furthermore, with the arrangement position of the vortex generator 10 being closer to the trailing edge than the transition position 22A under the variable speed operation condition in the blade normal state, under the variable speed operation condition in which drag penalty may increase drag, it is possible to reduce drag penalty due to provision of the vortex generator 10 while suppressing separation of a flow along the surface of the wind turbine blade 2.

Furthermore, typically, the surface of the wind turbine blade becomes less smooth due to degradation with age, and the roughness of the blade surface gradually increases. Thus, as compared to the blade normal state in which the blade surface is smooth, in the blade degradation state in which the roughness of the blade surface is relatively high, the transition position and the separation position of a flow along the blade surface is offset toward the leading edge. Thus, in some cases, it is desirable to determine the arrangement position of the vortex generator 10 in the second region N to be a position capable of enjoying an aerodynamic effect of the vortex generator 10 not only in the blade normal state but also in the blade degradation state, taking into account the aging degradation of the surface of the wind turbine blade 2.

Thus, in an embodiment, as shown in FIG. 8, the arrangement position of the vortex generator 10 in the second region N is determined to be a position closer to the trailing edge than the transition position under the variable speed operation condition in the blade normal state. Furthermore, the arrangement position of the vortex generator 10 in the second region N is determined to be a position closer to the leading edge than the separation position under the rated speed operation condition in the blade degradation state.

According to the above described embodiment, the arrangement position of the vortex generator 10 is closer to the leading edge than the separation position 23B under the rated wind speed condition in the blade degradation state, and thereby it is possible to enjoy the effect of the vortex generator 10 to improve the lift drag ratio, regardless of the degradation state of the wind turbine blade.

It should be noted that the transition position 22A under the variable speed operation condition and the separation position 23B under the rated wind speed condition may be obtained by the numerical calculation, and the numerical calculation method used therein may be performed by using CFD, or the viscous-inviscid interaction method described below.

The viscous-inviscid interaction method is for simply analyzing the performance of a two-dimensional airfoil, characterized in that the analysis time is extremely short compared to that of CFD. For instance, while CFD requires a couple of hours for analysis of one condition, the viscous-inviscid interaction method completes such an analysis in a couple of seconds.

The numeral calculation method using the viscous-inviscid interaction method will be described. In the viscous-inviscid interaction method, calculation is performed separately in a region where the viscosity is dominant (region in the vicinity of the blade or of blade wake) and in a region where the viscosity can be ignored (region away from the blade), and the speed and pressure distribution are obtained in each region. Specifically, a boundary layer equation is solved in a region where viscosity is dominant, and a potential equation ignoring viscosity is solved in a region where viscosity can be ignored. By combining analyses of two regions obtained as described above, it is possible to simulate an actual physical phenomenon.

Representative analysis results that can be obtained by the viscosity-inviscid interaction method includes, for instance, a pressure coefficient distribution on the blade surface, a friction coefficient distribution on the blade surface, a boundary layer thickness distribution on the blade surface, a lift coefficient of the blade, and a drag coefficient of the blade. From these analysis results, it is possible to evaluate the aerodynamic characteristics such as the transition position and the separation position, and the stall angle, in a blade cross section.

Furthermore, in a case where the separation position 23B under the rated wind speed condition is obtained by numeral calculation, numeral calculation may be performed under a condition such that the transition position 22B of a flow on the surface of the wind turbine blade 2 is fixed to the leading edge 6 of the wind turbine blade 2.

According to findings of the present inventors, the transition position 22B is close to the leading edge 6 under a rated wind speed condition in which the attack angle α is relatively large. Thus, by performing numeral calculation under a condition such that the transition position 22B is fixed to the leading edge 6, it is possible to perform determination of the arrangement position of the vortex generator 10 efficiently.

Next, a mounting range and an arrangement position of the vortex generator 10 according to some embodiments will be described with reference to FIGS. 12 to 15.

Figure 12:
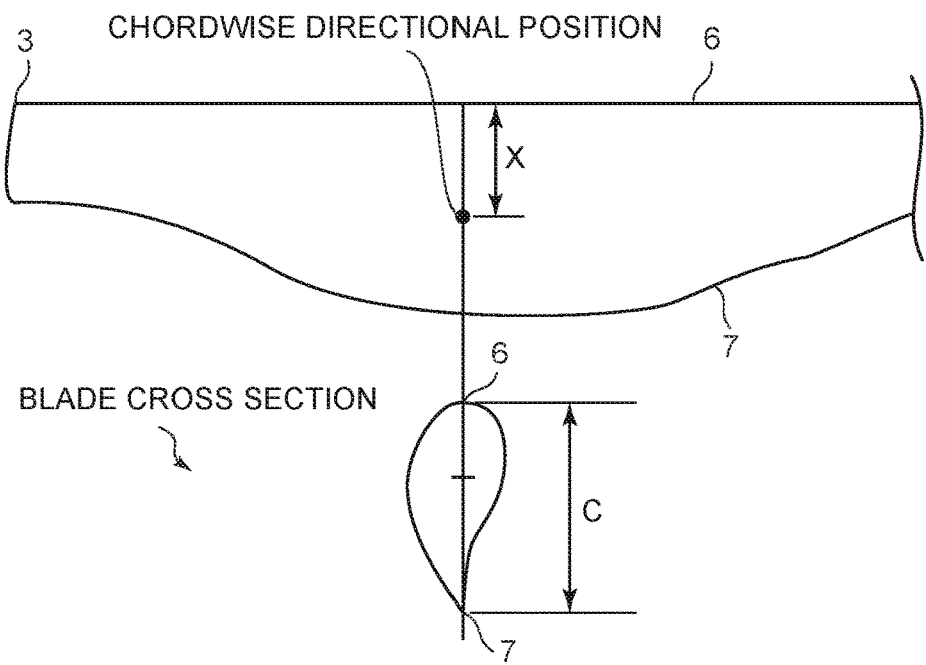
FIG. 12 is a planar view and a cross-sectional view of a wind turbine blade according to an embodiment.

In some embodiments, at a blade spanwise directional position in the mounting range, the arrangement position of the vortex generator 10 is determined such that a ratio x/C of a chordwise directional position x from the leading edge to the chord length C is not greater than 50%. The chordwise directional position x in FIG. 12 is a position coordinate, in the chordwise direction, of a point on the blade surface, where the leading edge 6 is the origin.

Figure 13:
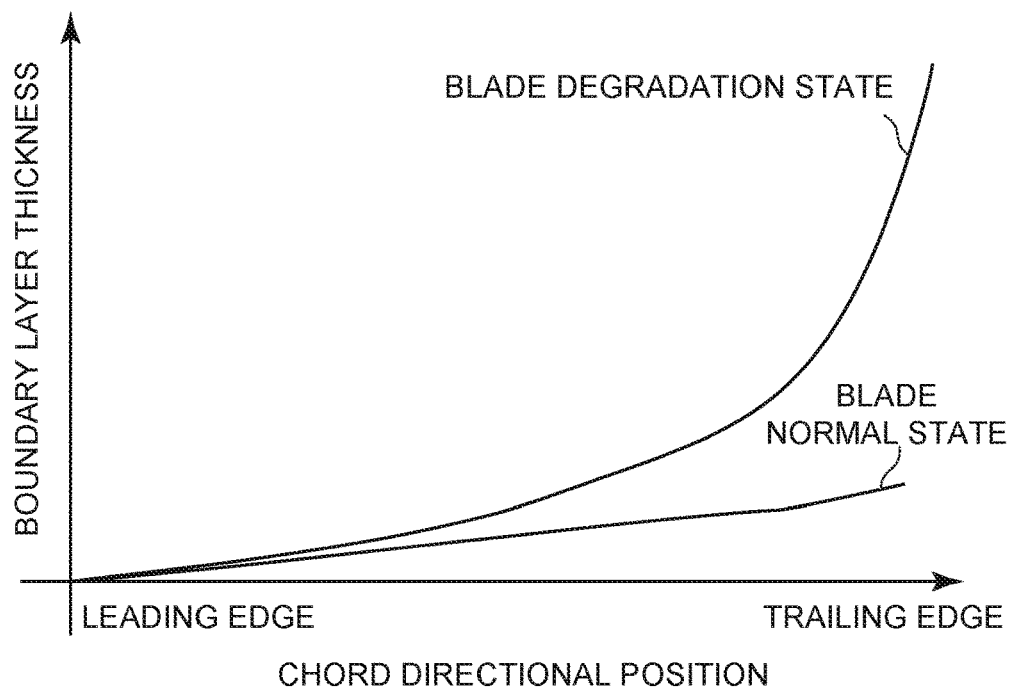
FIG. 13 is a graph showing a relationship between the chordwise directional position and the boundary layer thickness.

The dimension of the vortex generator 10 is normally set in accordance with the boundary layer thickness. That is, a desirable height of a fin of the vortex generator 10 is a height that does not cause drag penalty, while covering the boundary layer thickness. FIG. 13 is a graph showing the boundary thickness layer with respect to the chordwise directional position, in the blade degradation state and the blade normal state. According to FIG. 13, the boundary layer thickness varies considerably toward the trailing edge 7, between the blade degradation state and the blade normal state. Thus, even if the vortex generator 10 has a dimension suitable for the blade degradation state at the trailing edge side, the dimension considerably exceeds the boundary layer thickness in the blade normal state. Accordingly, the drag of the vortex generator 10 itself increases, and drag penalty occurs. In contrast, even if the vortex generator 10 has a dimension suitable for the blade normal state at the trailing edge side, the thickness is smaller than the boundary layer thickness in the blade degradation state. Accordingly, the effect to suppress separation decreases in the blade degradation state.

According to findings of the present inventors, with the limit on the side of the trailing edge of the arrangement position of the vortex generator 10 along the chordwise direction being 50% from the leading edge, it is possible to reduce drag penalty caused by provision of the vortex generator 10, while suppressing separation of a flow along the surface of the wind turbine blade, in both of the blade degradation state and the blade normal state.

Figure 14A:
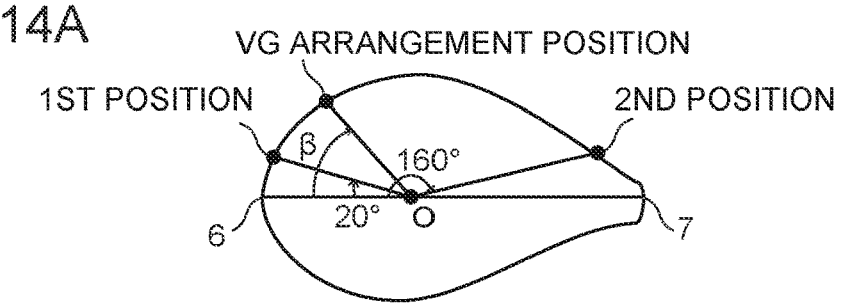
FIGS. 14A and 14B are cross-sectional views of a wind turbine blade according to an embodiment.
Figure 14B:
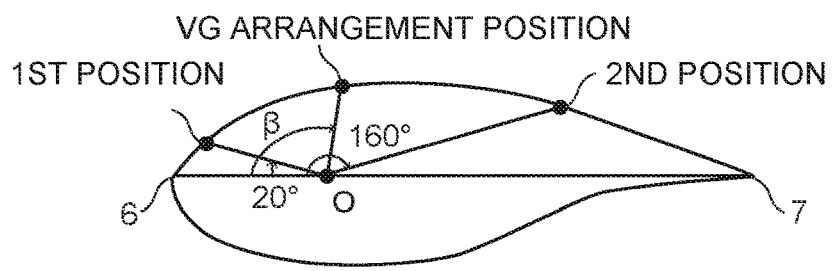

FIG. 14A is a cross-sectional view of the blade root side, and FIG. 14B is a cross-sectional view of the blade tip side. In some embodiments, as shown in FIGS. 14A and 14B, in a blade spanwise directional position in the mounting range, the angular range for mounting the vortex generator is determined in an angular range between the first position on the suction surface of the wind turbine blade offset by 20 degrees toward the trailing edge with reference to the leading edge and the second position on the suction surface offset by 160 degrees toward the trailing edge with reference to the leading edge. Further, the arrangement position of the vortex generator is determined such that the mounting angle β with reference to the leading edge increases toward the blade tip side.

Figure 15:
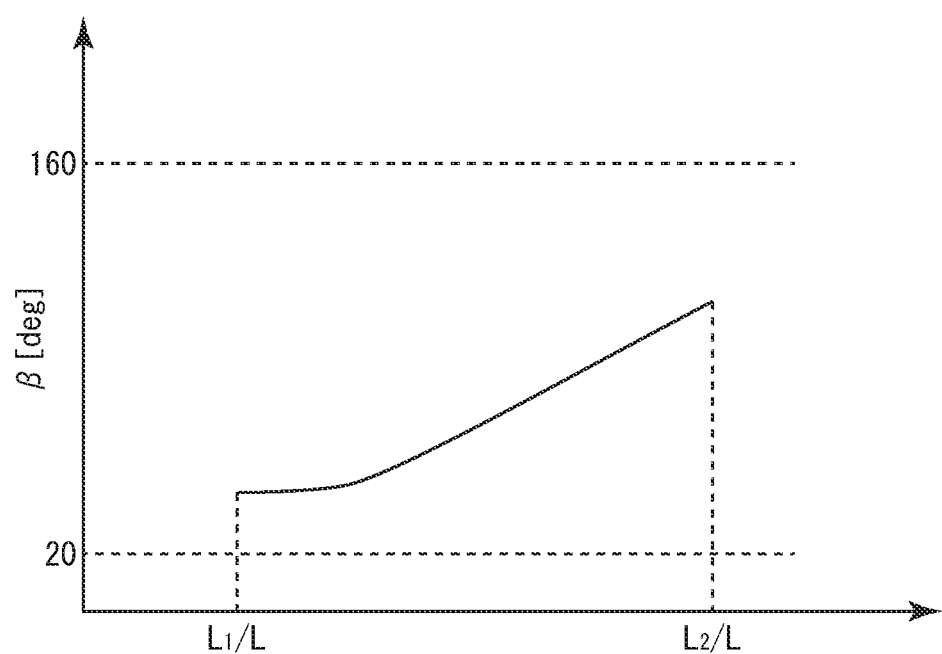
FIG. 15 is a graph showing a relationship between the radial directional position from the blade root and the mounting angle according to an embodiment.

Accordingly, the mounting angle of the vortex generator 10 with reference to the leading edge increases toward the blade tip, and thus it is possible to realize an appropriate arrangement of the vortex generator 10 taking into account the changing trend of the attack angle with respect to the blade spanwise directional position (i.e., the trend of the attack angle to decrease toward the blade tip). Furthermore, by setting the mounting angle of the vortex generator 10 with reference to the leading edge in the above numerical range (not smaller than 20 degrees and not greater than 160 degrees with reference to the leading edge), it is possible to achieve a high lift-drag ratio. FIG. 15 is a graph showing a relationship between the radial directional position from the blade root 3 and the mounting angle according to an embodiment.

Embodiments of the present invention were described in detail above, but the present invention is not limited thereto, and various amendments and modifications may be implemented.

In the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

Furthermore, an expression such as "comprise", "include", "have", "contain" and "constitute" are not intended to be exclusive of other components.

The invention claimed is:

1. A method of determining an arrangement position of each vortex generator of a plurality of vortex generators on a wind turbine blade, the method comprising:
    determining, for a first region of a mounting range of the vortex generators in a blade spanwise direction, an arrangement position of at least one first vortex generator of the plurality of vortex generators to be an angular position offset by a predetermined angle toward a trailing edge of the wind turbine blade with reference to an inflow angle of wind to the wind turbine blade; and
    determining, for a second region of the mounting range closer to a blade tip than the first region, the arrangement position of at least one second vortex generator of the plurality of vortex generators to be a position between a separation position of a flow on a surface of the wind turbine blade under a rated wind speed condition and a transition position of the flow on the surface of the wind turbine blade under a variable speed operation condition of a wind turbine including the wind turbine blade.

2. The method according to claim 1, further comprising:
    obtaining the separation position under the rated wind speed condition by calculation based on hydrodynamics under a condition where the transition position of the flow on the surface of the wind turbine blade is fixed to a leading edge of the wind turbine blade; and
    obtaining the transition position of the flow on the surface of the wind turbine blade by calculation based on hydrodynamics under the variable speed operation condition.

3. The method according to claim 1,
    wherein, the determining the arrangement position of the at least one second vortex generator for the second region includes determining the arrangement position of the at least one second vortex generator in the second region to be a chordwise directional position between the separation position and the transition position.

4. The method according to claim 1,
    wherein an angle between the inflow angle and the angular position of the at least one first vortex generator determined for the first region is not smaller than 60 degrees and not greater than 90 degrees.

5. The method according to claim 1,
    wherein the first region is a region where a maximum blade thickness ratio (tmax/C) of a maximum blade thickness (tmax) to a chord length (C) is not smaller than 60%.

6. The method according to claim 1,
    wherein the arrangement position of each vortex generator of the vortex generators is determined so that a ratio (x/C) of a chordwise directional position (x) from a leading edge of the wind turbine blade to a chord length (C) is not greater than 60% at a blade spanwise directional position in the mounting range.

7. The method according to claim 1,
    wherein the arrangement position of each vortex generator of the vortex generators is determined so that a ratio (x/C) of a chordwise directional position (x) to a chord length (C) is not smaller than 5% at a blade spanwise directional position in the mounting range.

8. The method according to claim 1,
    wherein a blade-root side end portion of the mounting range is positioned closer to the blade tip than a 5% position of a blade length (L) of the wind turbine blade from the blade root in the blade spanwise direction.

9. The method according to claim 1,
    wherein the arrangement position of each vortex generator of the vortex generators is determined so that a mounting angle of said each vortex generator with reference to a leading edge of the wind turbine blade varies within an angular range between a first position on a suction surface of the wind turbine blade and a second position on the suction surface to increase toward the blade tip, the first position being offset by 20 degrees from the leading edge toward the trailing edge, the second position being offset by 160 degrees from the leading edge toward the trailing edge.

10. The method according to claim 1,
    wherein the vortex generators include a plurality of fin sets formed by a pair of fins each having a pressure surface and a suction surface, and arranged so that the suction surfaces face each other, and
    wherein, in the mounting range, the vortex generators are arranged so that a ratio (Z/S) of an arrangement pitch (Z) of adjacent two of the fin sets to an interval (S) of trailing edges of the pair of fins is not smaller than 1.5 and not greater than 3.0.

11. The method according to claim 1,
    wherein each vortex generator of the vortex generators includes a pair of fins arranged line symmetrically with respect a segment along a chordwise direction of the wind turbine blade.

12. A method of producing a wind turbine assembly including a wind turbine blade and a plurality of vortex generators mounted to the wind turbine blade, the method comprising:
    for each vortex generator of the plurality of vortex generators,
        determining an arrangement position of said each vortex generator on the wind turbine blade by the method according to claim 1; and
        mounting said each vortex generator to the wind turbine blade at the arrangement position.

13. The method according to claim 12,
wherein said each vortex generator includes:
- a plurality of fins; and
- a platform portion to be mounted to a surface of the wind turbine blade, the platform portion including a front surface on which the plurality of fins are disposed upright and a flat bottom surface opposite to the front surface, and wherein the mounting said each vortex generator includes mounting said each vortex generator to the wind turbine blade in a state where said each vortex generator is oriented so that a cross sectional shape at the platform portion along the blade spanwise direction is a curved convex shape.

14. The method according to claim 12,
wherein said each vortex generator includes a pair of fins each including a suction surface having a curved convex shape, and arranged so that the suction surfaces face each other, and
wherein the mounting said each vortex generator includes mounting said each vortex generator to the wind turbine blade in a state where said each vortex generator is oriented such that fin chords of the fins are oblique with respect to a chordwise direction of the wind turbine blade.

15. The method according to claim 1,
wherein the arrangement position of the at least one first vortex generator is determined irrespective of the separation position and the transition position.

16. The method according to claim 1,
wherein the arrangement position of the at least one first vortex generator is determined to be discontinuous with respect to the arrangement position of the at least one second vortex generator.

17. A method of determining arrangement positions of vortex generators including at least one first vortex generator and at least one second vortex generator on a wind turbine blade, the method comprising:
- determining for the at least one first vortex generator an angular position which is offset by a predetermined angle toward a trailing edge of the wind turbine blade from an inflow angle of wind to the wind turbine blade, in a first region of a mounting range of the vortex generators in a blade spanwise direction; and
- determining for the at least one second vortex generator a position between a separation position of a flow on a surface of the wind turbine blade under a rated wind speed condition and a transition position of the flow on the surface of the wind turbine blade under a variable speed operation condition of a wind turbine including the wind turbine blade, in a second region of the mounting range closer to a blade tip than the first region.

18. The method according to claim 17,
wherein the angular position of the at least one first vortex generator is determined irrespective of the separation position and the transition position.

19. The method according to claim 17,
wherein the angular position of the at least one first vortex generator is determined such that an arrangement position of the at least one first vortex generator defined by the angular position is discontinuous with respect to the arrangement position of the at least one second vortex generator.

* * * * *